Figure 1:
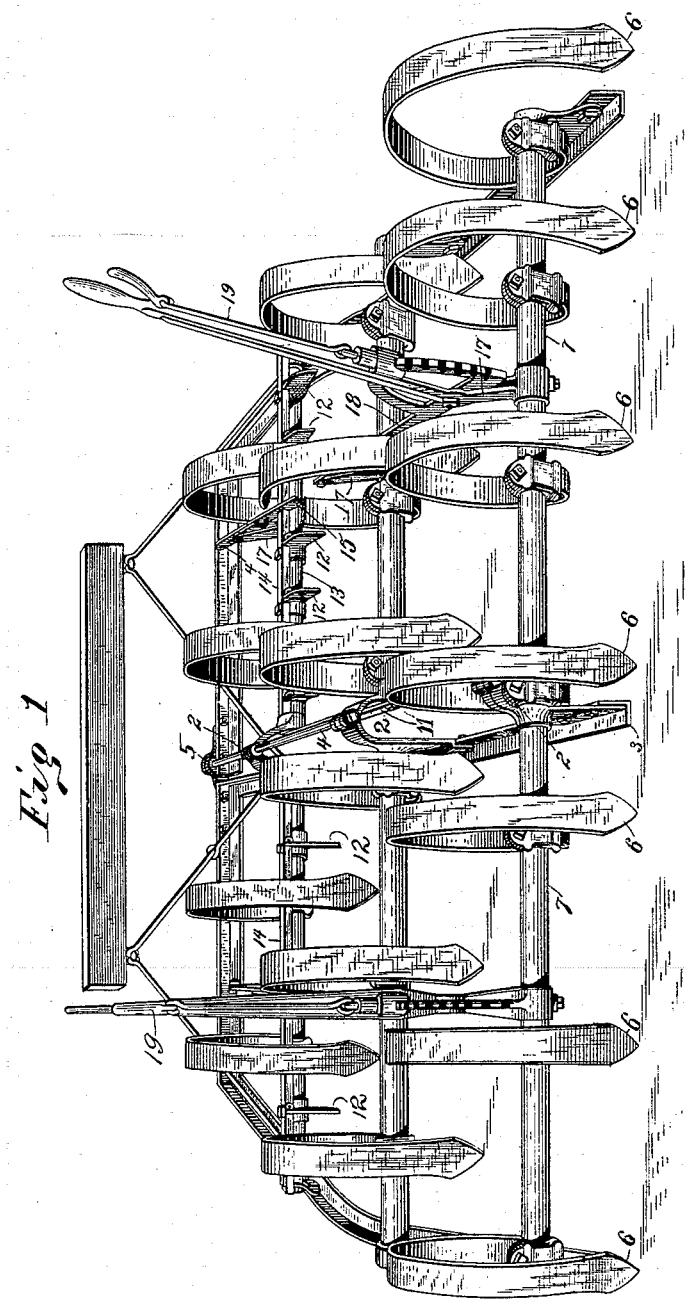

(No Model.)  2 Sheets—Sheet 1.
J. E. SHEIBLEY.
SPRING TOOTH HARROW.

No. 604,272. Patented May 17, 1898.

Witnesses
C. C. Bucline
W. Hume Clendenin

Inventor
Jacob E. Sheibley
by Dubois & ——
Attorneys.

(No Model.) 2 Sheets—Sheet 2.
J. E. SHEIBLEY.
SPRING TOOTH HARROW.
No. 604,272. Patented May 17, 1898.
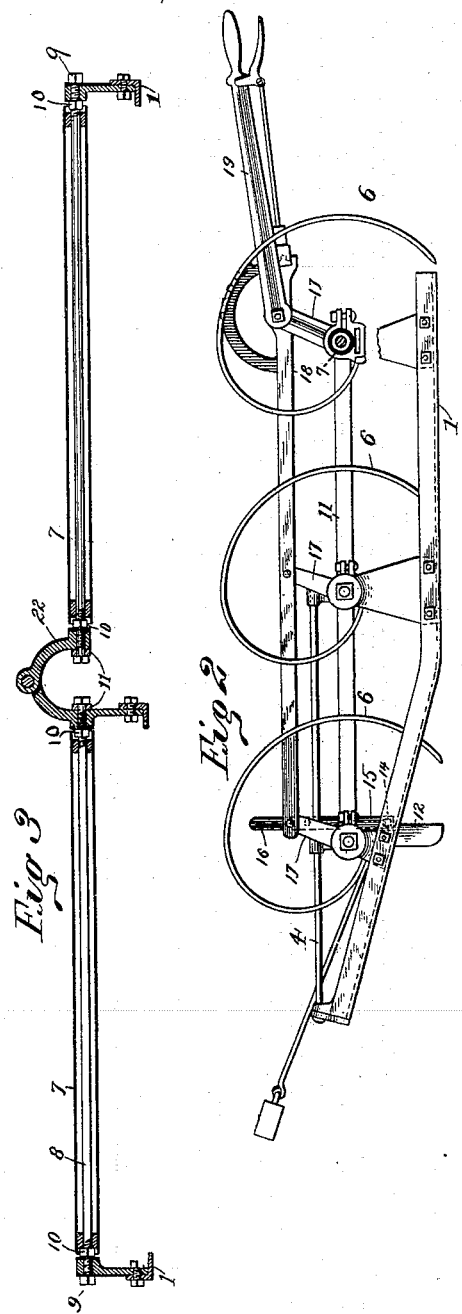
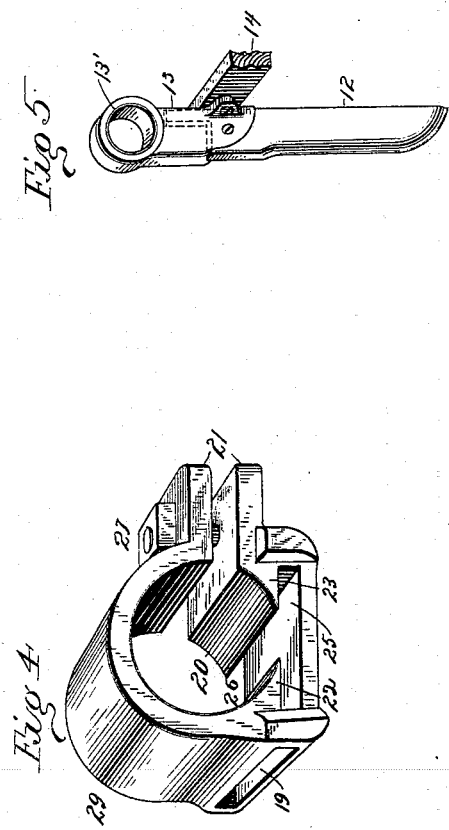
Witnesses
C. C. Burdine
N. Hume Clendenin
Inventor
Jacob E. Sheibley
Attorneys.

UNITED STATES PATENT OFFICE.

JACOB E. SHEIBLEY, OF HARRISBURG, PENNSYLVANIA, ASSIGNOR, BY MESNE ASSIGNMENTS, TO THE NATIONAL HARROW COMPANY, OF NEW JERSEY.

SPRING-TOOTH HARROW.

SPECIFICATION forming part of Letters Patent No. 604,272, dated May 17, 1898.

Application filed January 18, 1893. Serial No. 458,823. (No model.)

*To all whom it may concern:*

Be it known that I, JACOB E. SHEIBLEY, a citizen of the United States, residing at Harrisburg, in the county of Dauphin and State of Pennsylvania, have invented certain new and useful Improvements in Spring-Tooth Harrows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to harrows, and more particularly to that class in which the teeth are thrown into and out of engagement with the ground by a hand-lever and in which the harrow is provided with runner constructions to support it when the teeth are raised out of the ground.

The best form in which I have contemplated embodying my invention is illustrated in the accompanying drawings, and my said invention is disclosed in the description contained herein and in the appended claims.

In the drawings, Figure 1 is a perspective view of my improved harrow, showing the teeth lifted from the ground. Fig. 2 is a side elevation. Figs. 3, 4, and 5 are detail views of parts.

The frame of the harrow is composed of two sections hinged together centrally of the harrow. Each section is constructed of draft and cross bars, the latter preferably extending approximately at right angles to or transversely of the line of draft. Each of the sections has an outer draft or frame bar 1, which constitutes a runner. The inner draft-bars of the two sections are not the same in this instance in the two sections. The section at the left in Fig. 1 has an inner draft-bar, also forming a runner, the two runners being connected at the front by a front cross-bar 5. The remaining cross-bars of this section are each composed of a hollow rock-shaft or tooth-bar 7 and a rod 8, upon which it is journaled and which extends entirely through the hollow shaft or tooth-bar, and each rod 8 is secured at each end to the brackets extending upward from the runners by nuts 9 and 10, one on the outside and the other on the inside of the bracket. These nuts secure the rods 8 tightly in place and make the frame of the section very strong and rigid. The other section is also provided with a front cross-bar 5; but the inner side or draft bar 11 of this section does not in this instance form a runner, but extends rearwardly in the plane of the cross-bars, which are constructed and connected to the sides of the frame in the same manner as in the other section. At the ends of the cross-bars the two sections are joined by an arched hinge construction. In this instance the two parts of the hinge are of unequal length, the shorter part 22 extending downward only to the side bar 11, while the other extends downwardly to the runner 3 and constitutes the bracket or support for the inner end of a cross-bar of that section. The three forward hinges are connected by a rod 4, forming the pivot for these hinges. It will thus be seen that the harrow is supported centrally by a runner construction, which obviates clogging by reason of supporting certain of the inner ends of the cross-bars, so as to have a free or clearance space beneath them. This is accomplished by removing the runner from beneath them and supporting them on an adjacent runner construction.

The teeth of the harrow, which are preferably of the arched spring form, are secured to the hollow rock-shafts 7, forming part of the cross-bars, by my improved clip, which is shown in detail in the enlarged view, Fig. 4. This clip or socket is composed of a single casting 29. This clip or casting has a socket 19 to receive the end of the tooth and a cylindrical aperture 20 to receive the rock-shaft 7. This aperture 20 extends into the tooth-socket. The casting is thickened at one side, and this thickened portion is slotted, the slot extending into the aperture 20, forming a split ring, with the arms 21 on each side of the slot. These arms 21 are perforated to receive a clamping-screw 27. In assembling the parts of the harrow the casting is first placed upon the hollow rock-shaft. The tooth is then inserted in the socket, and the nut on the bolt 27 is then turned until the rock-shaft is forced into contact with the tooth, locking the tooth, clip, and rock-shaft rigidly together.

To each rock-shaft 7 is secured an arm 17, and all of arms 17 of one section are pivotally connected with a bar 18. By moving the bar 18 lengthwise of the section the rock-shafts are turned upon their supporting-rods 8 and the teeth thrown into or out of operative position. This is accomplished by a lever 19, which forms an extension or continuation of the arm 17 on the rear rock-shaft of the section. The parts are retained in the position desired by a notched or ratchet sector secured to the bar 18 and a spring-pawl carried by the arm 19, which are of usual construction.

In addition to the usual teeth for engaging and stirring the soil I provide the harrow with clod cutting and crushing blades to cut and crush the clods or lumps of earth which may be encountered. This clod device consists of a series of steel cutting-blades 12, which are removably fastened in sleeves 13, loosely mounted on the front rock-shaft of each section. The sleeves of each section are connected by a bar or rod 14, secured to each, so that they will move in unison when it is desired to throw them into or out of use. To the bar 14 is secured an upwardly-extending arm 15, which is provided with apertures 16 to receive a locking-pin attached to one of the arms 17, the arm 15 being secured to the bar 14 in proper relation to the arm 17 to permit this to be done.

I have set forth in the foregoing specification and in the drawings my improvements and the best method for operating the same. I, however, do not intend to limit myself to the particular features illustrated and described, as various modifications and changes will readily suggest themselves to those skilled in the art which do not depart from the spirit of my invention. I claim all mechanical equivalents in accomplishing the results illustrated in the specifications as hereinbefore set forth. In forming the draft runners or bars they are preferably deflected upward and inwardly at their points, forming, so to speak, ground-runners, while the turnable tooth-bars are carried in an elevated plane above the runners for giving large clearance under the tooth-bars between the runners.

What I claim, and desire to secure by Letters Patent, is—

1. A harrow having a frame including among its members rigidly-secured transverse rods and hollow rock-shafts loosely mounted on said rods, harrow-teeth rigidly secured to said rock-shafts and means for holding said shafts in different positions to adjust the harrow-teeth, substantially as described.

2. In a harrow the combination with the side bars, of transverse rods rigidly secured to the side bars, hollow rock-shafts loosely mounted upon said rods, harrow-teeth secured to said rock-shafts and means for rocking said rock-shafts, substantially as described.

3. In a harrow the combination with the hollow rock-shafts, of rods extending entirely through the shafts and jam-nuts securing said rods to the sides of the frame, whereby the frame is made rigid and the shafts left free to turn on said rods, substantially as described.

4. A socket for harrow-teeth formed in one piece provided with an aperture to engage the tooth-bar, a socket to receive the tooth, clamping-jaws and a clamping-bolt, the said tooth-bar aperture extending into the tooth-socket whereby the clamping-bolt clamps the tooth against the tooth-bar, substantially as described.

5. In a harrow the combination with the circular-surfaced tooth-bars, of a socket formed in one piece having a tooth-socket, a circular aperture for the tooth-bar extending into the tooth-socket and the clamping jaws and bolt, substantially as described.

6. A harrow composed of two hinged sections each section having a runner on its outer side, the two sections having a runner construction for supporting the inner sides of the sections, said inner runner construction forming a part of the inner side bars of the said sections, substantially as described.

7. A harrow composed of two hinged sections, each section having a runner on its outer side forming the outer side bar of such section, the said harrow having an inner or central runner construction forming a part of the inner side bars of the said sections, a part of the inner side bars of said sections being held out of contact with the ground to facilitate clearance, substantially as described.

8. In a sectional turnable-tooth-bar harrow, the combination therewith of the three runners or draft-bars, the outer runner on each section being deflected inwardly, hinged together at their front; the turnable tooth-bars mounted on the runners and lever-operating mechanism, substantially as set forth.

9. The combination in a harrow of the tooth-bar; the tooth-clip surrounding the tooth-bar provided with an opening to allow the tooth-bar to engage the tooth; a transverse tooth-seat through the clip below the tooth-bar, a curved spring-tooth and a screw-threaded binder for securing the parts, as set forth.

10. In a sectional three-runner harrow, the combination of turnable tooth-bars arranged across the line of draft and carrying teeth, and draft-bars or runners, the draft-bars of a section connected at the front by a cross connection integral with and at right angles to the inner draft-bar or runner, substantially as described.

11. In a sectional harrow, the combination of draft-bars or runners deflected upwardly at their front portions and at the front connected by an elevated cross-bar from which one runner extends at right angles, said bars bent from one integral metal bar, and tooth-bars connecting and carried in an elevated plane above the runners and provided with teeth and adjusting means, substantially as described.

12. In a turnable-tooth-bar harrow, the combination of the draft-bars or runners having their front ends deflected upwardly, a series of turnable tooth-bars mounted in brackets in an elevated plane above the draft-bars in substantially the same horizontal plane with the front elevated portion of the draft-bars, and lever-operating mechanism for the purposes stated.

13. In a sectional harrow the combination of three runners, the tooth-bars supported in an elevated plane above the plane of the runners, and the supporting-hinges between the sections, substantially as shown.

14. In a sectional harrow, the combination of outer and inner runners, the runners of a section formed in one piece and continued across the front with the inner runner extending backward at a right angle and in the line of draft and parallel with the outer runner in a portion of its length, the turnable tooth-bars elevated above the plane of the runners and carrying teeth, and centrally-disposed hinges between the sections, substantially as described.

15. A sectional harrow consisting of three runners or draft-bars to each two sections; turnable tooth-bars; separating and supporting connections for separating and supporting the turnable tooth-bars in an elevated plane above the runners or draft-bars and hinges between the sections, as set forth.

16. A sectional harrow consisting of three runners or draft-bars to each two sections; turnable tooth-bars having curved spring-teeth; separating and supporting connections for separating and supporting the turnable tooth-bars in an elevated plane above the runners or draft-bars and hinges between the sections, as set forth.

In testimony whereof I affix my signature in presence of two witnesses.

JACOB E. SHEIBLEY.

Witnesses:
CHAS. WAGNER,
SAML. E. RUPP.